United States Patent

Mino et al.

[11] Patent Number: 5,159,854
[45] Date of Patent: Nov. 3, 1992

[54] GEAR DRIVE UNIT

[75] Inventors: Kaoru Mino, Konan; Kazuo Yokoigawa, Mibu, both of Japan

[73] Assignee: Zexel Corporation, Tokyo, Japan

[21] Appl. No.: 734,687

[22] Filed: Jul. 23, 1991

[30] Foreign Application Priority Data

Jul. 31, 1990 [JP] Japan .................. 2-202747

[51] Int. Cl.⁵ ............... F16D 13/08; F16D 47/00; F24F 13/15
[52] U.S. Cl. .................. 74/810.1; 74/89.14; 192/41 S; 192/48.92; 454/155; 454/315
[58] Field of Search .............. 74/89.14, 425, 810.1; 98/2, 40.27, 110; 454/155, 315

[56] References Cited

U.S. PATENT DOCUMENTS

| | | | |
|---|---|---|---|
| 2,894,403 | 7/1959 | Tomko | 192/41 S X |
| 3,035,504 | 5/1962 | Cline et al. | 98/40.27 |
| 4,676,146 | 6/1987 | Takahashi et al. | 98/2 X |
| 4,986,400 | 1/1991 | Heller | 192/48.92 X |

FOREIGN PATENT DOCUMENTS

| | | | |
|---|---|---|---|
| 1159026 | 2/1958 | France | 74/810.1 |
| 61-44243 | 3/1986 | Japan | |
| 61-161356 | 7/1986 | Japan | 98/40.27 |

*Primary Examiner*—Allan D. Herrmann
*Attorney, Agent, or Firm*—Wenderoth, Lind & Ponack

[57] ABSTRACT

A gear drive unit of the type including a twin-shaft selective output mechanism is disclosed wherein first and second overrunning clutch mechanisms constituting the twin-shaft selective output mechanism are each composed of a spring-receiving chamber, a coiled spring and a driven gear. The first overrunning clutch mechanism, in response to rotation of a worm wheel in a forward direction, radially expands a first coiled spring to connect the worm wheel and a first driven gear, thereby connecting the worm wheel and a first driven gear to transmit the forward rotation of the worm wheel to the driven gear. Similarly, the second overrunning clutch mechanism is responsive to rotation of the worm wheel in the reverse direction to enlarge the diameter of a second coiled spring, thereby connecting the worm wheel and a second driven gear to transmit the reverse rotation of the worm wheel to the second driven gear. The twin-shaft selective output mechanism using such coiled springs is simple in construction and easy to manufacture.

3 Claims, 4 Drawing Sheets

GEAR DRIVE UNIT

BACKGROUND OF THE INVENTION

1. Field of the Invention

The present invention relates to a gear drive unit suitable for use as an actuator for air-conditioners used mainly for motor vehicles.

2. Description of the Prior Art

Japanese Patent Laid-open Publication No. 61-44243 discloses a gear drive unit so constructed as to drive two output shafts separately by a single motor. The disclosed gear drive unit includes, as shown here in FIGS. 6 and 7 of the accompanying drawings, a motor 100, a set of spur gears 102, 104 receiving an output from the motor 100 and rotatable in opposite directions, two overrunning or freewheeling clutches 106, 108 for receiving a driving force from the corresponding spur gears 102, 104, and two output shafts 120, 122 receiving the driving force transmitted thereto via the corresponding overrunning clutches 106, 108. All of the components 100-122 jointly constitute a twin-shaft selective output mechanism constructed. With this construction, when an input shaft 124 is rotated by the motor 100 in a forward direction, the output of the motor 100 is transmitted via the overrunning clutch 106 to an output shaft 120. On the other hand, when the motor 100 rotates the input shaft 124 in the reverse direction, the output of the motor 100 is transmitted via the overrunning clutch 108 to an output shaft 122.

Each of the overrunning clutches 106, 108, as best shown in FIG. 7, is composed of a circular inner rotary disk 128, 130 mounted on the input shaft 124, 126 and having at least one pawl 132 (two being shown) at a suitable position on its outer peripheral edge portion, and a cup-shaped outer rotary disk 134, 136 mounted on the output shaft 120, 122 and having sawtoothed projections or gear teeth on its inner peripheral surface. The pawl 132, held by spring compression against the gear teeth, permits the output shaft 120, 122 to turn freely only under certain conditions.

Since the twin-shaft selective output mechanism is disposed on a large torque side which is downstream of a reduction gear, not shown, operatively connected between the motor 100 and the input shaft 124, the overrunning clutches 106, 108 which constitute a part of the twin-shaft selective output mechanism must have a mechanical strength large enough to withstand such large torque. In addition, the overrunning clutches 106, 108 are complicated in construction and hence require an increased number of processing steps.

SUMMARY OF THE INVENTION

With the foregoing difficulties of the prior art in view, it is an object of the present invention to provide a gear drive unit having a twin-shaft selective output mechanism which is simple in construction and capable of reducing the overall size of the gear drive unit.

According to the present invention, there is provided a gear drive unit which comprises a motor rotatable in forward and reverse directions, a worm fixedly mounted on a rotating shaft of the motor, a worm wheel meshing with the worm, a twin-shaft selective output mechanism including first and second overrunning clutch mechanisms capable of being selectively engaged depending on the direction of rotation of the worm wheel, first and second reduction gears held in mesh with first and second driven gears, respectively, of the twin-shaft selective output mechanism, and first and second output shafts connected with the first and second reduction gears, respectively, and adapted to be connected with first and second driven members.

With this construction, an output of the motor is transmitted via the twin-shaft selective output mechanism to a selected one of the first and second output shafts depending on the direction of rotation of the motor. The twin-shaft selective output mechanism is disposed on a low torque side (upstream of the reduction gears) and hence does not require a large mechanical strength. In addition, the twin-shaft selective output mechanism is contained in the worm wheel so that the overall size of the gear drive unit can be reduced. Since the coiled springs constitute a main portion of the twin-shaft selective output mechanism, the twin-shaft selective output mechanism is simple in construction and easy to manufacture.

The above and other objects, features and advantages of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

Figure 1:
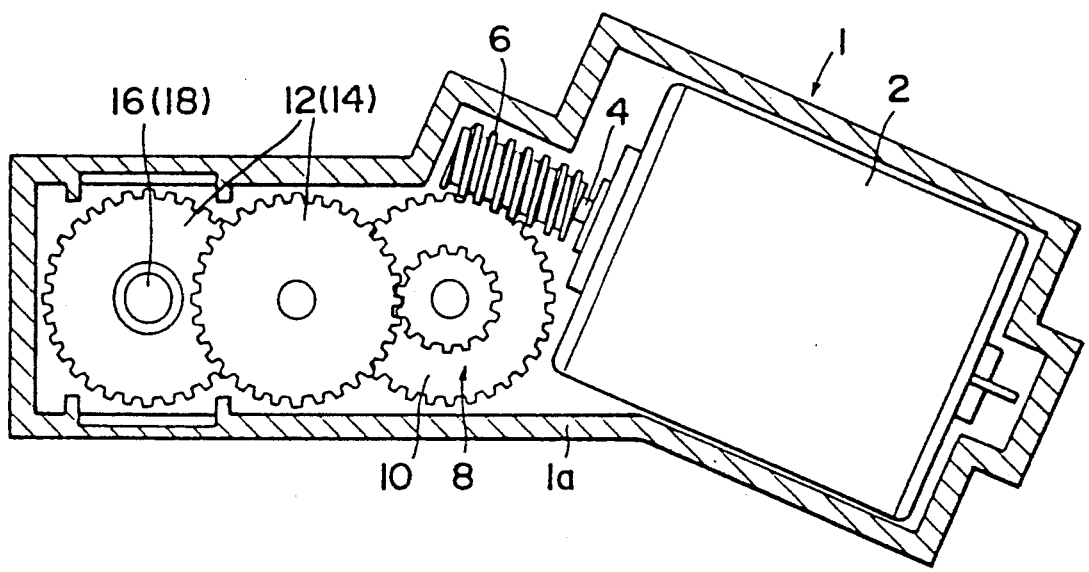
FIG. 1 is a vertical cross-sectional view of a gear drive unit according to the present invention.
Figure 2:
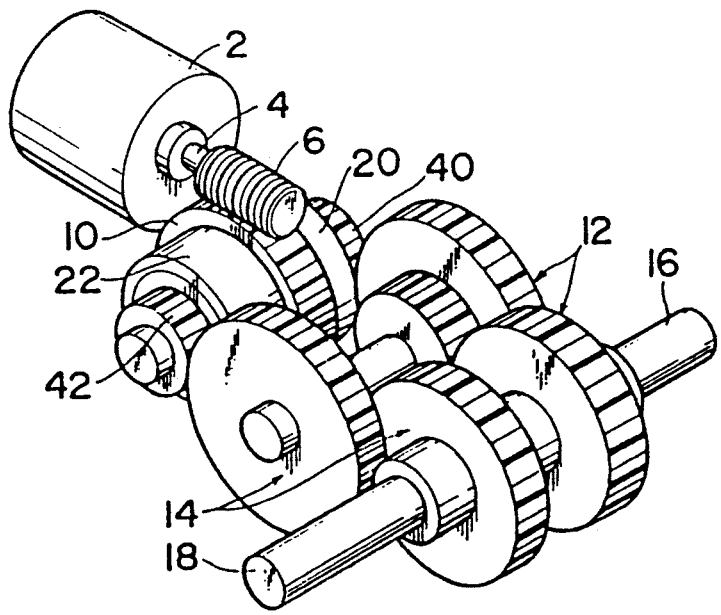
FIG. 2 is a perspective view showing the internal construction of the gear drive unit.
Figure 3:
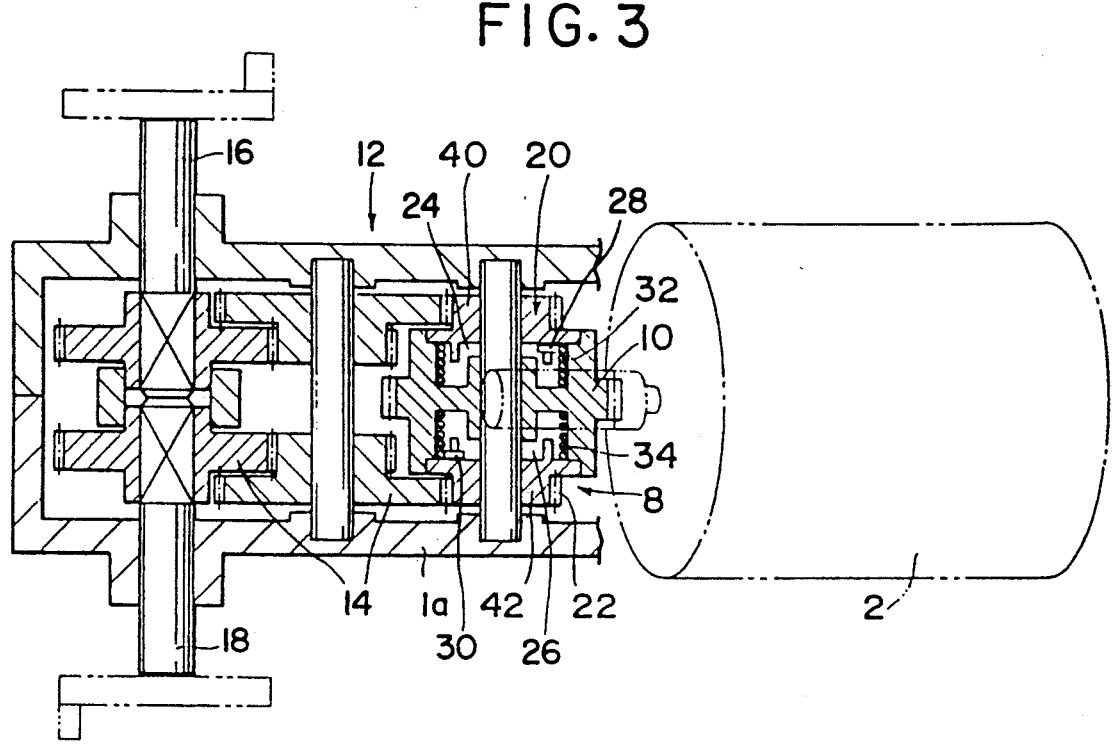
FIG. 3 is a horizontal cross-sectional view of the gear drive unit.

The present invention will be described hereinbelow in greater detail with reference to a preferred embodiment shown in the accompanying drawings.

As shown in FIGS. 1 through 4, a gear drive unit 1 comprises a case 1a in which are disposed a motor 2, a worm 6 fixedly mounted on a rotating output shaft 4 of the motor 2, a worm wheel 10 meshing with the worm 6 and containing a twin-shaft selective output mechanism 8 described later, first and second reduction gears (gear trains) 12, 14 held in mesh with first and second driven gears 40, 42 of the twin-shaft selective output mechanism 8, and first and second output shafts 16, 18 connected in driven relation to the first and second reduction gears 12, 14 and adapted to be connected with first and second driven members of a device with which the gear drive unit 1 is associated.

The twin-shaft selective output mechanism 8 includes a first overrunning clutch mechanism 20 which permits transmission of a rotational driving force from the motor 2 to the first driven gear 40 only when the motor 2 is rotating in one direction (a forward direction or a reverse direction), and a second overrunning clutch mechanism 22 which permits transmission of the rotational driving force from the motor 2 to the second driven gear 42 when the motor 2 is rotating in the opposite direction (the reverse direction or the forward direction).

Figure 4:
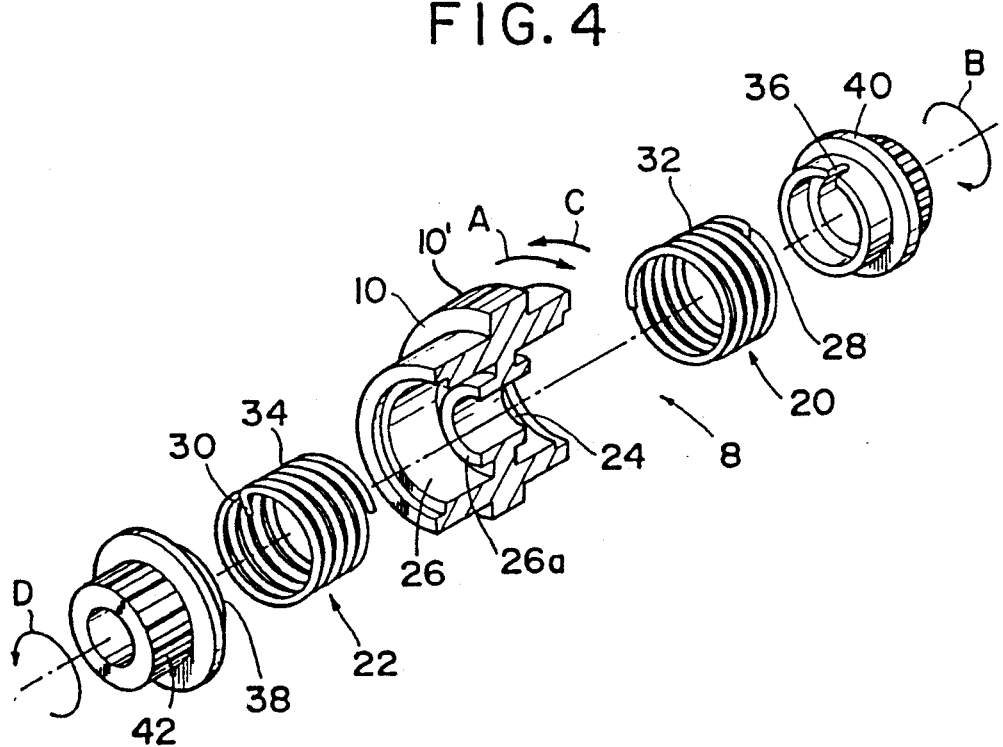
FIG. 4 is an exploded perspective view of a twin-shaft selective output mechanism of the gear drive unit.

As shown in FIG. 4, the first overrunning clutch mechanism 20 includes a substantially circular cylindrical first spring-receiving chamber 24 defined concentrically in the worm wheel 10 on one side of the gear teeth 10′, a first coiled spring 32 slidably received in the first spring-receiving chamber 24 and having a locking prong 28 at one end thereof, and the first driven gear 40 rotatably received in the first spring-receiving chamber 24 and having a locking groove 36 held in interlocking engagement with the locking prong 28 of the first coiled spring 32. Similarly, the second overrunning clutch mechanism 22 includes a substantially circular cylindrical second spring-receiving chamber 26 defined concentrically in the worm wheel 10 on the opposite side of the gear teeth, a second coiled spring 34 slidably received in the second spring-receiving chamber 26 and having a locking prong 30 at one end thereof, and the second driven gear 42 rotatably received in the second spring-receiving chamber 26 and having a locking groove 38 held in interlocking engagement with the locking prong 30 of the second coiled spring 34. The first and second coiled springs 32, 34 are coiled or wound in the same direction. Designated by 26a is a boss of the worm wheel 10.

The first and second overrunning clutch mechanisms 20, 22 operate as follows. When the motor 2 is driven in a forward direction to rotate the worm wheel 10 in a direction indicated by the arrow A in FIG. 4, the first coiled spring 32 of the first overrunning clutch mechanism 20 is subjected to a traction or adhesive friction acting between an inner peripheral surface of the first spring-receiving chamber 24 and the first coiled spring 21 in a direction to radially expand or loosen the first coiled spring 32. Consequently, the radially expanded first coiled spring 32 engages an inner peripheral surface of the first spring-receiving chamber 24 with an enhanced friction and transmits a rotational driving force from the worm wheel 10 to the first driven gear 40 via the interlocking engagement between the locking prong 28 and the locking groove 36, whereby the first driven gear 40 is rotated in a direction of the arrow B which is the same as the direction of rotation of the worm wheel 10. In this instance, rotation of the worm wheel 10 creates a force tending to radially contract or tight the first coiled spring 34 of the second overrunning clutch mechanism 22, so that the worm wheel 10 rotates freely with the radially contracted second coiled spring 34 slightly separated from an inner peripheral surface of the second spring-receiving chamber 26. Thus, the rotational driving force from the worm wheel 10 is not transmitted to the second driven gear 42.

Conversely, when the motor 2 is driven in the reverse direction to rotate the worm wheel 10 in a direction indicated by the arrow C in FIG. 4, the second coiled spring 34 of the second overrunning clutch mechanism 22 is subjected to a traction or adhesive friction tending to radially expand or loosen the second coiled spring 34. As a consequence, the radially expanded second coiled spring 34 frictionally engages the inner peripheral surface of the second spring-receiving chamber 26 and transmits a rotational driving force from the worm wheel 10 to the second driven gear 42 via the interlocking engagement between the locking prong 30 and the locking groove 38, whereby the second driven gear 42 is rotated in a direction indicated by the arrow D which is the same as the direction of rotation of the worm wheel 10. In this instance, rotation of the worm wheel 10 radially contracts or tightens the first coiled spring 32, so that the worm wheel 10 rotates freely with the radially contracted first spring 32 slightly separated from the inner peripheral surface of the first spring-receiving chamber 24. Thus, the rotational driving force form the worm wheel 10 is not transmitted to the first driven gear 40.

As appears clear from the foregoing description, the twin-shaft selective output mechanism 8 is so constructed as to transmit a driving force selectively to the first driven gear 40 and the second driven gear 42 depending on the direction of rotation of the motor 2 such that the driving force is transmitted to the first drive gear 40 via the first overrunning clutch mechanism 20 when the motor 2 is rotated in the forward direction, while the driving force is transmitted to the second driven gear 42 via the second overrunning clutch mechanism 22 when the motor 2 is rotated in the reverse direction.

Figure 5:
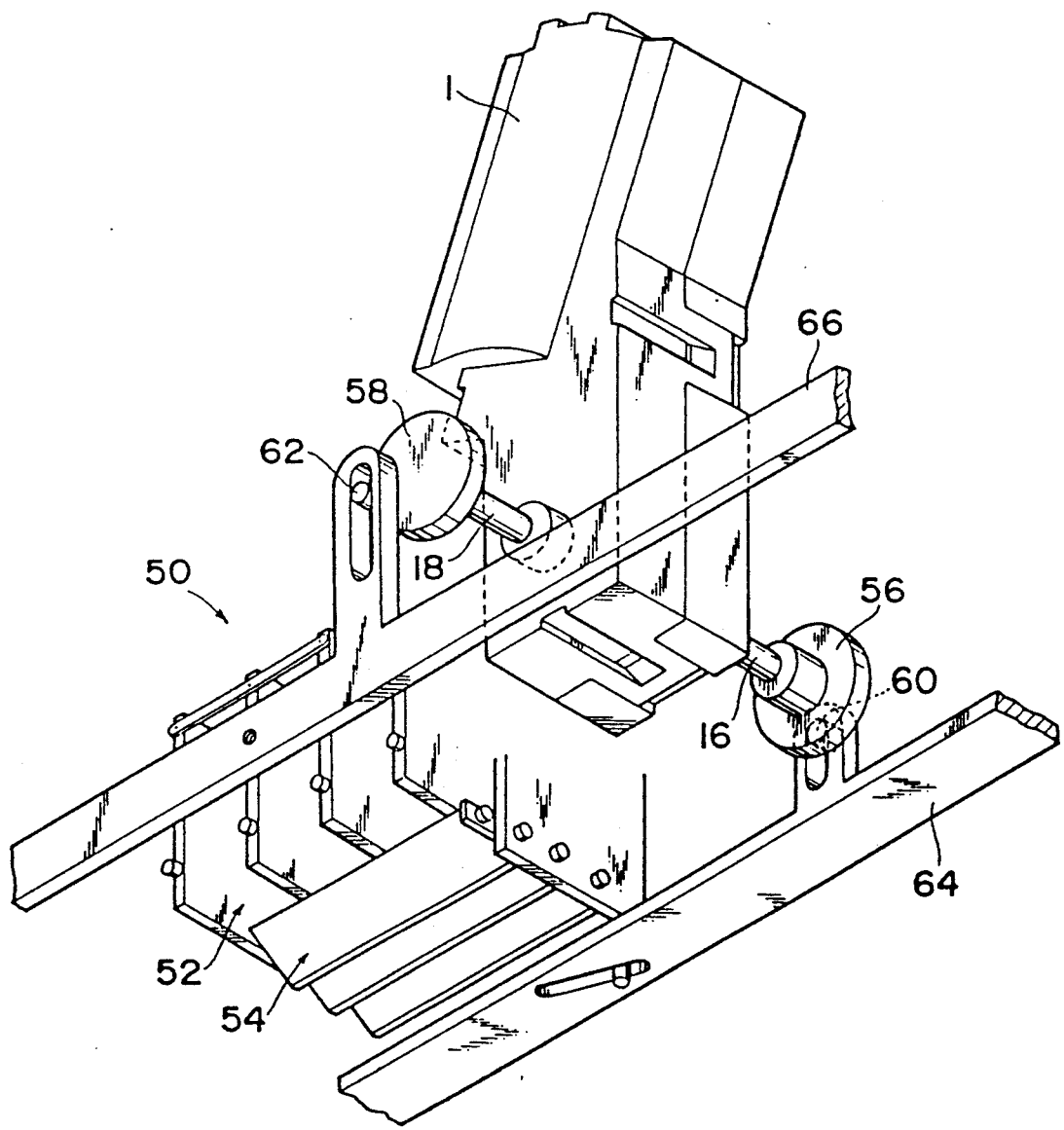
FIG. 5 is a fragmentary perspective view of the gear drive unit as it is assembled with an air discharge grille of an air-conditioner.
Figure 6:
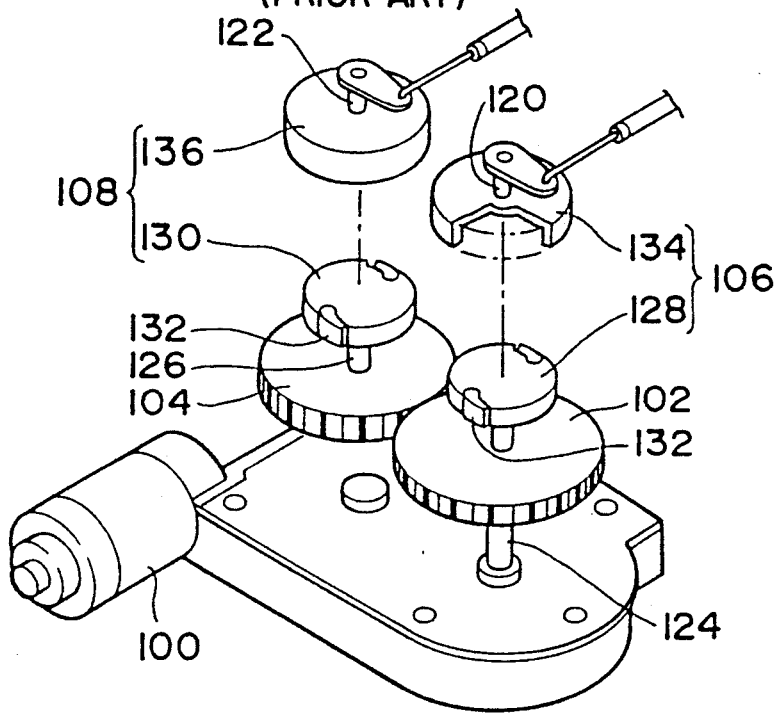
FIG. 6 is an exploded perspective view of a conventional gear drive unit.
Figure 7:
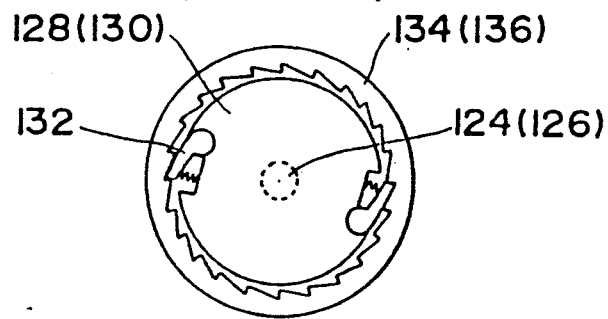
FIG. 7 is an enlarged cross-sectional view of an overrunning clutch of the conventional gear drive unit.

Operation of the gear drive unit 1 of the foregoing construction will be described below with reference to FIGS. 1 through 5. As shown in FIG. 5, the gear drive unit 1 is assembled with an air discharge grille 50 of an air-conditioner. The air discharge grille 50 includes a row of horizontally arranged louvers 52 for distributing discharged air in the horizontal direction, a row of vertically arranged louvers 54 for distributing discharged air in the vertical direction, first and second cranks 56, 58 firmly connected to one end of the first and second output shafts 16, 18 of the gear drive unit 1 and having first and second eccentric pins 60, 62, respectively, and a pair of parallel spaced horizontal levers 64, 66 linked with the corresponding cranks 56, 58 via the pins 60, 62 for moving the vertical louvers 54 and the horizontal louvers 52, respectively. With the gear drive unit 1 thus assembled with the air discharge grille 50 of the air-conditioner, when the motor 2 is driven in the forward direction, the worm wheel 10 is rotated in one direction via the worm 6. In response to the rotation of the worm wheel 10, the first driven gear 40 of the first overrunning clutch mechanism 20 is rotated in the same direction as the worm wheel 10. Rotation of the first driven gear 40 causes the first reduction gear 12 to turn, thereby transmitting a rotational driving force to the first output shaft 16 and the crank 56 connected thereto. As the crank 56 rotates, the vertical louvers 54 are moved in the vertical direction via the lower lever 64. During that time, the driving force is not transmitted to the second output shaft 18 with the result that the horizontal louvers 52 are at rest.

Conversely, when the motor 2 is driven in the reverse direction, the worm wheel 10 is rotated in the opposite direction via the worm 6. In response to the rotation of the worm wheel 10, the second driven gear 42 of the second overrunning clutch mechanism 22 is rotated in the same direction as the worm wheel 10. Rotation of the second driven gear 42 causes the second reduction gear 14 to turn, thereby transmitting a rotational driving force to the second output shaft 18 and thence to the crank 58. As the crank 58 rotates, the horizontal louvers 52 are moved in the horizontal direction via the upper lever 66. During that time, the driving force is not transmitted to the first output shaft 16 with the result that the vertical louvers 54 are at rest.

Since the twin-shaft selective output mechanism 8 of the gear drive unit 1 is disposed on a lower torque side, the first and second overrunning clutch mechanisms 20, 22 are not required to have such a large mechanical strength as required by those of the conventional gear drive unit. In addition, the twin-shaft selective output mechanism 8 disposed inside the worm wheel 10 minimizes the overall size of the gear drive unit 1.

Furthermore, since each of the first and second overrunning clutch mechanisms 20, 22 is composed of a worm wheel 10, a coiled spring 32, 34 and a driven gear 40, 42, the overrunning clutch mechanisms 20, 22 are simpler in construction and easier to manufacture than the conventional overrunning clutches Obviously, various minor changes and modifications of the present invention are possible in light of the above teaching. It is therefore to be understood that within the scope of the appended claims the invention may be practiced otherwise than as specifically described.

What is claimed is:

1. A gear drive unit, comprising:
   a motor rotatable in forward and reverse directions and having an output shaft;
   a worm fixedly mounted on said output shaft of said motor;
   a worm wheel having gear teeth meshed with said worm;
   a twin-shaft selective output mechanism including first and second driven gears, and first and second overrunning clutch mechanisms capable of selectively driving one of said first and second driven gears depending on the direction of rotation of said worm wheel;
   first and second reduction gears held in mesh with said first and second driven gears, respectively, of said twin-shaft selective output mechanism;
   first and second output shafts connected with said first and second reduction gears, respectively, and adapted to be connected with first and second driven members; and
   wherein said first and second overrunning clutch mechanisms of said twin-shaft selective output mechanism are disposed inside said worm wheel and on respectively opposite sides of said gear teeth of said worm wheel.

2. A gear drive unit according to claim 1, wherein said first overrunning clutch mechanism includes a first spring-receiving chamber defined in said worm wheel at one side thereof, a first coiled spring received in said first spring-receiving chamber and having a first locking prong at one end thereof, wherein said first driven gear is rotatably disposed in said first spring-receiving chamber and interlocked with said first coiled spring by said first locking prong, and whereby said first coiled spring, in response to rotation of said worm wheel in a forward direction, is radially expandable to engage an inner peripheral surface of said first spring-receiving chamber, to thereby transmit forward rotation of said worm wheel to said first driven gear.

3. A gear drive unit according to claim 2, wherein said second overrunning clutch mechanism includes a second spring-receiving chamber defined in said worm wheel at the opposite side thereof, a second coiled spring received in said second spring-receiving chamber and having a second locking prong at one end thereof, wherein said second driven gear is rotatably disposed in said second spring-receiving chamber and interlocked with said second coiled spring by said second locking prong, and whereby said second coiled spring, in response to rotation of said worm wheel in a reverse direction, is radially expandable to engage an inner peripheral surface of said second spring-receiving chamber, to thereby transmit reverse rotation of said worm wheel to said second driven gear.

* * * * *